(12) United States Patent
Easton et al.

(10) Patent No.: US 11,913,436 B2
(45) Date of Patent: Feb. 27, 2024

(54) CONTROL OF SMA HAPTIC ASSEMBLY

(71) Applicant: CAMBRIDGE MECHATRONICS LIMITED, Cambridge (GB)

(72) Inventors: Mark Easton, Cambridge (GB); Andrew Benjamin Simpson Brown, Cambridge (GB); Marc-Sebastian Scholz, Cambridge (GB)

(73) Assignee: CAMBRIDGE MECHATRONICS LIMITED, Cambridgeshire (GB)

( * ) Notice: Subject to any disclaimer, the term of this patent is extended or adjusted under 35 U.S.C. 154(b) by 0 days.

(21) Appl. No.: 17/798,928

(22) PCT Filed: Feb. 17, 2021

(86) PCT No.: PCT/GB2021/050386
§ 371 (c)(1),
(2) Date: Aug. 11, 2022

(87) PCT Pub. No.: WO2021/165670
PCT Pub. Date: Aug. 26, 2021

(65) Prior Publication Data
US 2023/0072354 A1 Mar. 9, 2023

(30) Foreign Application Priority Data
Feb. 17, 2020 (GB) .................................... 2002153

(51) Int. Cl.
*F03G 7/06* (2006.01)
*G06F 3/01* (2006.01)
*H01H 3/00* (2006.01)

(52) U.S. Cl.
CPC ......... *F03G 7/06143* (2021.08); *F03G 7/062* (2021.08); *F03G 7/064* (2021.08); *G06F 3/016* (2013.01); *H01H 2003/008* (2013.01)

(58) Field of Classification Search
CPC ...... F03G 7/06143; F03G 7/062; F03G 7/064; G06F 3/016; H01H 2003/008
(Continued)

(56) References Cited

U.S. PATENT DOCUMENTS 9,836,123 B2 * 12/2017 Gipson .................. G06F 3/016
2011/0095975 A1 * 4/2011 Hwang ............... H04M 1/0268
345/156

(Continued)

FOREIGN PATENT DOCUMENTS

EP 2 315 186 4/2011
EP 3 136 224 3/2017
(Continued)

OTHER PUBLICATIONS

GB Search Report and Examination Report of GB Application 2002153.1 dated Oct. 8, 2020.
(Continued)

*Primary Examiner* — Hoang M Nguyen
(74) *Attorney, Agent, or Firm* — Haley Guiliano LLP

(57) ABSTRACT

There is provided a method of driving a shape memory alloy haptic assembly comprising an actuator comprising shape memory alloy that is arranged on actuation to provide a haptic effect, the method comprising supplying drive current to the actuator successively during a pre-heating period in which the temperature of the shape memory alloy is raised without causing the shape memory alloy to provide the haptic effect and during an actuation period in which the temperature of the shape memory alloy is raised so as to cause the shape memory alloy to provide the haptic effect. A shape memory alloy haptic assembly is also provided.

20 Claims, 5 Drawing Sheets

(58) Field of Classification Search
USPC .............................. 60/527–529; 310/306–307
See application file for complete search history.

(56) References Cited

U.S. PATENT DOCUMENTS

| | | | |
|---|---|---|---|
| 2012/0212442 A1 | 8/2012 | Uchida et al. | |
| 2017/0061753 A1* | 3/2017 | Khoshkava | G08B 6/00 |
| 2017/0336869 A1* | 11/2017 | Khoshkava | G06F 1/1643 |
| 2020/0117274 A1* | 4/2020 | Brown | G06F 3/016 |
| 2021/0398402 A1* | 12/2021 | Richards | G08B 6/00 |

FOREIGN PATENT DOCUMENTS

| | | |
|---|---|---|
| EP | 3 246 078 | 11/2017 |
| GB | 2578454 | 5/2020 |

OTHER PUBLICATIONS

International Search Report and Written Opinion of PCT/GB2021/050386 dated Jul. 12, 2021.

* cited by examiner

CONTROL OF SMA HAPTIC ASSEMBLY

CROSS-REFERENCE TO RELATED APPLICATION

This application is a national stage application under 35 U.S.C. § 371 of International Application No. PCT/GB2021/050386, filed Feb. 17, 2021, which claims priority of GB Patent Application No. 2002153.1, filed Feb. 17, 2020, the disclosures of each of which are hereby incorporated by reference herein in their entireties.

The present invention relates to the control of actuators using shape memory alloy (SMA) wires to produce relative movement between two components. In particular, it relates to the control of such actuators used in haptic assemblies.

SMA actuators are known for use in handheld electronic devices, such as cameras and mobile phones. In particular, they can be used to provide haptic functionality for tactile feedback, for example in response to a user selecting a particular area of a screen or pressing a button. Such actuators typically function by using the contraction of an SMA wire to cause relative motion of two components. The SMA wire is in contact with parts of two opposing bodies which are forced apart due to the change in length of the SMA wire as it contracts. The tactile feedback may be in the form of a 'click' sensation, vibrations, or similar.

In order to cause the SMA to contract and cause movement in the actuator, the SMA must be heated until it makes a transition between two crystalline states. To produce some types of tactile feedback (such as a 'click' sensation), the contraction of the SMA must occur over a relatively short time period, e.g. a few milliseconds. Producing this effect requires delivering the energy to heat the SMA to cause the transition in a sufficiently short time, which in turn requires a relatively high power to be delivered to the SMA. Particularly in mobile or wearable devices, a battery may not be able to supply the energy in the required time, due to limitations on the ability of the battery to sustain a high power output.

One solution to this problem is to use a capacitor circuit, which is charged prior to actuation. The capacitor circuit is designed to be able to provide the sustained power output needed to actuate the SMA wire. However, a capacitor capable of providing the necessary sustained power output would be physically large, and therefore unsuited for a mobile device. For example, 20-30 mJ is typical for the energy required to actuate an SMA haptic assembly in a mobile device. A capacitor that can store 30 mJ at a voltage of 5 V, which is typical for a mobile device power supply, would need to have a capacitance of 2200 µF, and would have a physical size in the region of 22.4 mm×2.5 mm. This would be too large to be practical in a mobile device, where the area occupied by components is at a premium.

There is therefore a need to control an SMA haptic assembly to actuate in a sufficiently short time to provide haptic signals, without requiring large capacitors. It is an aim of the present invention to address this problem.

According to the present invention, there is provided a method of driving a shape memory alloy haptic assembly comprising an actuator comprising shape memory alloy that is arranged on actuation to provide a haptic effect, the method comprising supplying drive current to the actuator successively during a pre-heating period in which the temperature of the shape memory alloy is raised without causing the shape memory alloy to provide the haptic effect and during an actuation period in which the temperature of the shape memory alloy is raised so as to cause the shape memory alloy to provide the haptic effect.

The desired haptic effect places constraints on how the shape memory alloy (SMA) is heated during the actuation period when it is providing the haptic effect, in order to cause the SMA to change crystalline states at the correct rate. However, the haptic effect is only provided when the SMA changes state, which is generally substantially above room temperature. Therefore, during a pre-heating period prior to providing the haptic effect where the SMA temperature is raised from ambient temperature, the constraints on how the SMA is heated are much relaxed. The division of the heating into these two periods therefore allows for much greater flexibility in how power is supplied to the SMA, rather than simply heating as fast as possible, which can provide advantages in terms of the design of other components of the haptic assembly.

In some embodiments, the profile of the power of the drive current versus time during the pre-heating period is different from the profile of the power of the drive current versus time during the actuation period. Providing power with a different profile in the pre-heating period to the actuation period means that the heating in the two periods can be optimised for the different requirements of the two periods.

In some embodiments, the drive current has a lower time-averaged power during at least part of the pre-heating period than during the actuation period, preferably during the entire pre-heating period. By pre-heating the SMA at a lower power in at least part of the pre-heating period, the power requirements of the actuator in this period are reduced, and the higher power is only required for an actuation period in which the SMA changes state. Therefore, the power supply is not required to sustain high power output for an extended period, but the actuation nonetheless occurs in a sufficiently short time to generate a haptic signal. This reduces the strain on the power supply and reduces the need to provide additional power supply components such as capacitors.

In some embodiments, during the preheating period, the temperature of the shape memory alloy is raised to a transition temperature at which the shape memory alloy starts to transform. This minimises the additional energy that must be provided to the SMA in the actuation to cause it to transform, as any further heating above the transition temperature will begin to cause a transformation of the SMA. During the preheating period, the temperature of the shape memory alloy may be raised to a temperature close to (e.g. within a few ° C. or a few tenths of a ° C.) the transition temperature at which the shape memory alloy starts to transform. In particular, in some embodiments, during the actuation period, the temperature of the shape memory alloy is raised to a temperature below the transition temperature at which the shape memory alloy starts to transform. In some embodiments, during the actuation period, the temperature of the shape memory alloy is raised to a temperature above the transition temperature at which the shape memory alloy starts to transform, thereby enabling the SMA to be fully transformed in the desired period, such that the haptic effect is properly provided.

In some embodiments, the pre-heating period is commenced in response to a demand signal for a haptic signal. By only beginning the heating after a demand signal is received, the SMA wire is not held at an elevated temperature for extended periods of time, thereby reducing energy consumption.

In some embodiments, the pre-heating period has a length of at most 80 ms, at most preferably 60 ms, more preferably at most 50 ms, more preferably at most 40 ms, most preferably at most 20 ms. Limiting the duration of the pre-heating period prevents the latency of actuation from being perceptible to the user, which would degrade the user experience.

In some embodiments, the pre-heating period is commenced in advance of a demand signal for a haptic signal and the actuation period is commenced in response to a said demand signal. Pre-heating prior to receiving a demand signal allows the actuator to respond more rapidly to the demand signal.

In some embodiments, the pre-heating period is commenced in response to occurrence of a precursor event. This allows the actuator to respond rapidly when the demand signal is received, while preventing the SMA from being held at an elevated temperature for extended periods, thereby reducing energy consumption.

In some embodiments, the pre-heating period comprises an initial heating period in which the temperature of the shape memory alloy is raised, and a hold period in which the temperature of the shape memory alloy is held within a predetermined temperature range. This means that the SMA can be maintained at an elevated temperature to allow the actuator to respond rapidly to a demand signal.

In some embodiments, the drive current is supplied to the actuator during the pre-heating period and the actuation period from the same current source. This removes the need to provide two separate sources that would increase the size and complexity of the system that includes the assembly.

In some embodiments, the drive current is supplied to the actuator during the pre-heating period and the actuation period from the same current source that is pulse width modulated by modulations having a different profile in the pre-heating period and the actuation period. Pulse-width modulation allows the supplied current to be regulated, and prevents too much current being drawn from the power supply, particularly in the pre-heating period.

In some embodiments, the drive current is supplied to the actuator during the pre-heating period and the actuation period from the same current source with different voltages in the pre-heating period and the actuation period. Controlling the voltage provides an alternative way to control the power of the drive current supplied during the two periods.

In some embodiments, the drive current is supplied to the actuator during the pre-heating period from a current source and during the actuation period at least partially from a capacitive element. Using a capacitive element during at least part of the actuation means the current source does not have to supply all of the power needed during the actuation period, which in many embodiments will be higher on average than that required during the pre-heating period. Since the capacitive element is only used during actuation, it can be made smaller than in prior art devices.

In some embodiments, the method further comprises charging the capacitive element during the pre-heating period. This ensures the capacitive element is ready for the actuation, without keeping it constantly charged, which would result in increased energy consumption.

In some embodiments, the method further comprises detecting a measure of resistance of the actuator, and controlling the supply of drive current during the pre-heating period based on the detected measure of resistance. The measure of resistance is indicative of the temperature of the SMA, and allows accurate control of the drive current to heat the SMA to the desired temperature during the pre-heating period. Using a measurement of resistance avoids the need to provide a specific temperature sensor.

In some embodiments, said control of the supply of drive current during the pre-heating period is control of the length of the pre-heating period. The length of the pre-heating period may be adjusted depending on the initial temperature of the SMA, as more or less energy may be required to reach the desired temperature.

In some embodiments, the method further comprises controlling the length of the actuation period based on the length of the pre-heating period. Depending on the ambient temperature, more or less energy may need to be supplied to the SMA to cause it to fully transition and fully actuate the actuator. The pre-heating period needed to reach the desired temperature is indicative of the ambient temperature and the rate of heat loss from the SMA, and therefore can be used to determine the necessary length of the actuation period.

In some embodiments, said control of the supply of drive current during the pre-heating period is control of the power of the drive current during the pre-heating period. Controlling the power allows the length of the pre-heating period to be kept consistent, while adjusting the delivered energy appropriately.

In some embodiments, the method further comprises sensing the ambient temperature with a temperature sensor, and controlling the supply of drive current during the pre-heating period and/or the actuation period based on sensed ambient temperature. This allows the profile of power supplied during the pre-heating period and/or the actuation period to be adjusted depending on how much energy must be supplied to achieve the desired heating effect.

In some embodiments, said control of the supply of drive current during the pre-heating period and/or the actuation period is control of the length of the pre-heating period and/or the actuation period. The length of the pre-heating period and/or the actuation period may be adjusted depending on the initial temperature of the SMA wire, as more or less heating may be required to achieve the desired heating effect.

In some embodiments, the drive current supplied to the actuator during one or both of the pre-heating period and the actuation period is pulse-width modulated, the method further comprising sensing the ambient temperature with a temperature sensor and controlling the duty cycle of the pulse width modulation based on sensed ambient temperature. By adjusting the duty cycle of the modulation, the pre-heating period can be kept constant to provide a predictable response time.

In some embodiments, said control of the supply of drive current during the pre-heating period and/or the actuation period is control of the power of the drive current during the pre-heating period and/or control of the power of the drive current during the actuation period. Controlling the power allows the length of the pre-heating period and/or the actuation period to be kept consistent, while adjusting the delivered energy appropriately.

In some embodiments, the actuation period has a length of at most 10 ms, preferably at most 5 ms, or more preferably at most 2 ms. This ensures the actuation occurs quickly enough to provide the desired sensation to the user.

According to a second aspect of the invention, there is provided a shape memory alloy haptic assembly implementing a similar method to the first aspect of the present invention.

Embodiments of the invention will now be described by way of non-limitative example with reference to the accompanying drawings, in which.

Figure 1:
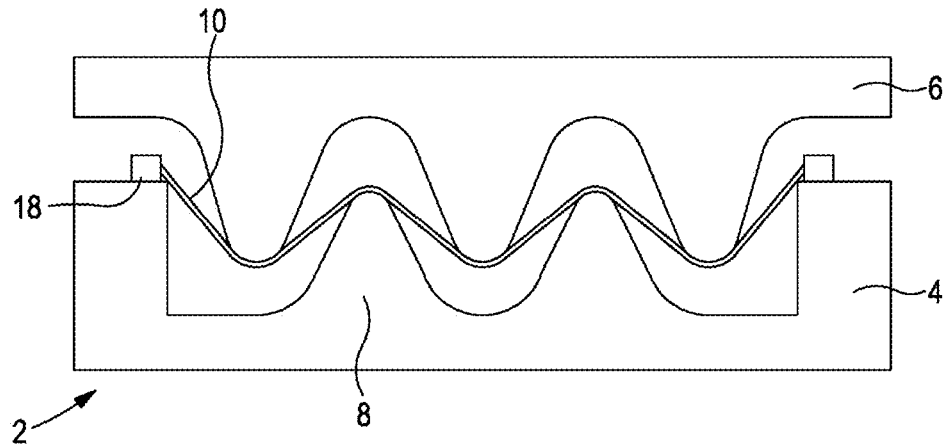
FIG. 1 shows an SMA actuator assembly.

A shape memory alloy haptic assembly of the type in which the present invention is intended to be used comprises an actuator 2, such as that shown in FIG. 1 or as described in WO 2019/162708 A1, which is incorporated herein by this reference (see e.g. FIG. 1 of WO 2019/162708 A1). The actuator 2 comprises shape memory alloy (SMA) 10 that is arranged on actuation to provide a haptic effect. The actuator 2 of FIG. 1 comprises first and second bodies 4, 6 each with one or more teeth 8. The SMA 10 is in the form of a wire that extends along a tortuous path between the first and second bodies 4, 6. On actuation, the SMA 10 contracts, thereby driving apart the first and second bodies 4, 6. The relative movement of the first and second bodies 4, 6 provides the haptic effect. A method of the first aspect is a method of driving a shape memory alloy haptic assembly comprising an actuator 2 such as that of FIG. 1.

An actuator 2 comprising SMA 10 is typically driven with one or more pulses of current that deliver energy to the SMA 10. In embodiments where the SMA 10 is in the form of a wire, the energy is delivered in the form of resistive heating due to current flowing in the SMA wire. Two processes are performed using this energy. The first part of the energy delivered heats the SMA 10, raising its temperature without causing the SMA to change its shape and/or size, which will occur when the SMA 10 reaches a transition temperature at which the SMA 10 starts to transform from one crystalline state to another, for example from a martensite to an austinite state. The second part of the energy delivered provides the energy to raise the temperature of the SMA 10 further, such that the transformation between the two states occurs. The transformation between the two states causes a change in the shape of the SMA 10 that performs the actuation. For instance, where the SMA 10 is a wire, the transformation may cause the wire to contract in length.

The performance of an SMA actuator 2 is often limited by the time it takes to deliver the second part of the energy, i.e. the time taken to transform the SMA 10 between the two crystalline states and actuate the actuator 2. The time to deliver this energy may be limited by the characteristics of the power supply (e.g. its maximum sustained power output) used to drive the actuator 2. As mentioned above, the limitations of the power supply can be overcome by storing energy on a capacitor. However, a capacitor able to store all the energy required to heat the SMA 10 and cause its transition would be physically large, and so might not be compatible with some applications such as mobile phone handsets or wearable devices. In addition, holding a capacitor in a charged state ready to actuate the actuator 2 is inefficient, because energy is lost due to current leakage through the capacitor.

To give an example of realistic parameters for an SMA haptic assembly intended for use in a mobile device, some appropriate values for an assembly for use in a mobile phone would be as follows:

the resistance of the SMA in the actuator is 5-7Ω;

the total required energy to actuate the actuator is 17.5 mJ, comprising 10.5 mJ to preheat the SMA to the transition temperature, and 7 mJ to transform the SMA between its two crystalline states;

the power supply is a power rail with a voltage of 5V which has been stepped up from a battery voltage of between 1.8 and 5 V; and the battery is restricted to supplying a maximum of 3 A over long periods.

In this example, if the battery were simply connected to the actuator 2, the initial current drawn would be $$\frac{5\text{ V}}{5\Omega} = 1\text{ Amp.}$$

This represents a significant fraction of the battery's maximum output, and so if the battery were to sustain this current for the entire period required to deliver 17.5 mJ, it may impact on the performance of other components of the mobile phone. This would in particular be true if multiple assemblies were present, and it were necessary or desirable to actuate multiple of the actuators at the same time. In such cases, the battery may not even be capable of supplying sufficient current to all of the assemblies at the same time. Further, in some mobile devices, the battery may not be capable of delivering a sufficiently high current even to a single assembly.

Therefore, the battery output to the SMA actuator may be reduced such that the actuation period becomes too long to provide a satisfactory haptic signal to the user. If a capacitor was used to store the energy required, and the energy was then supplied from the capacitor, the capacitor would need to be physically very large to store the 17.5 mJ of energy required.

Figure 4:
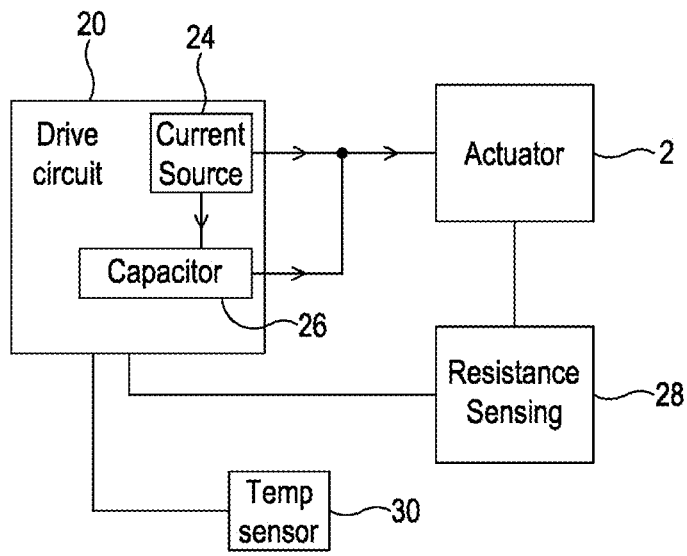
FIG. 4 shows a schematic of an assembly according to the invention.

To address this problem, a shape memory alloy haptic assembly is provided, such as that shown in FIG. 4. The assembly comprises an actuator 2 comprising shape memory alloy 10 that is arranged on actuation to provide a haptic effect such as shown in FIG. 1, and a drive circuit 20 arranged to supply drive current to the actuator 2 successively during a pre-heating period in which the temperature of the shape memory alloy 10 is raised without causing the shape memory alloy to provide the haptic effect and during an actuation period in which the temperature of the shape memory alloy 10 is raised so as to cause the shape memory alloy to provide the haptic effect. A corresponding method is provided comprising supplying drive current to the actuator 2 in the same manner as the drive circuit 20. The haptic effect will occur after the SMA 10 reaches the transition temperature at which it transforms between crystalline states. At this point, the SMA 10 will begin to exert a force to actuate the actuator 2. However, the haptic effect may not occur immediately the SMA 10 reaches or exceeds the (e.g. predicted) transition temperature. For example, a variable pre-loading force may exist on the actuator 2 due to external forces such as a user's finger on the actuator 2 and/or an external restraint. Therefore, the SMA 10 must transform sufficiently that the force generated by the SMA exceeds the pre-loading force before parts of the actuator 2 will move and the haptic effect will occur.

Figure 2:
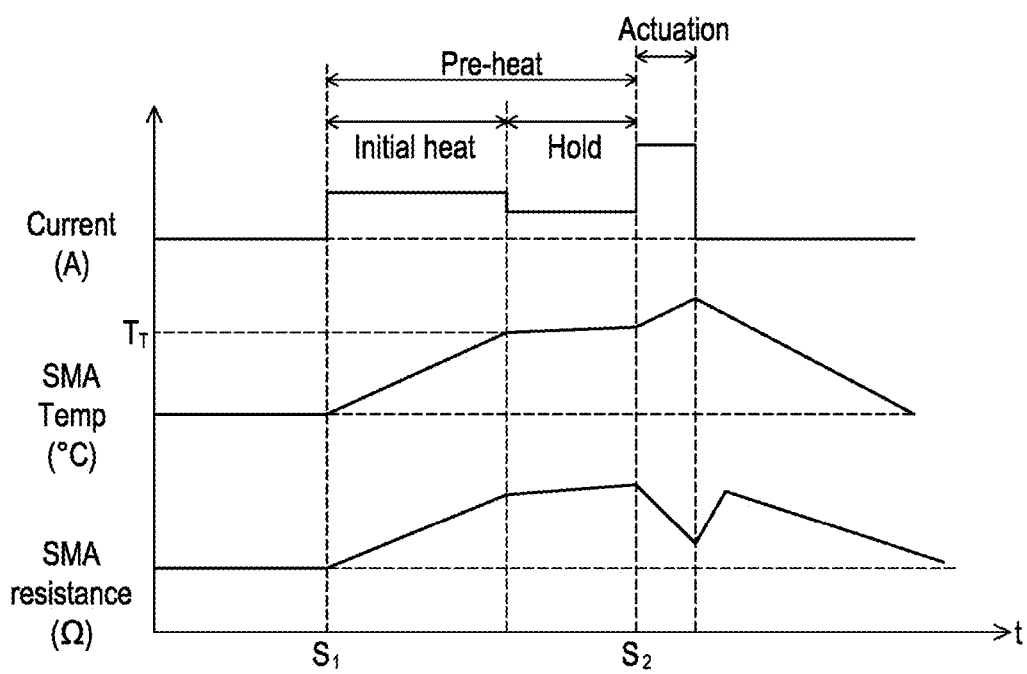
FIG. 2 is a graph showing an example of control of an actuator according to the invention.

By dividing up the provision of energy to the SMA 10 into these two periods, greater flexibility is provided in how the energy is delivered in these two periods, where the requirements on how the energy needs to be delivered to achieve the desired effects may be substantially different. In particular, the profile of the power of the drive current versus time during the pre-heating period is different from the profile of the power of the drive current versus time during the actuation period. For example, the drive current may have a first constant value during the pre-heating period, and a different, second constant value during the actuation period, as shown in FIG. 2. Alternatively, the drive current may vary in magnitude, or in its voltage or other properties, during both the pre-heating and actuation periods, but with different profiles (e.g. voltage over time or magnitude of current over time).

In particular, the drive current has a lower time-averaged power during at least part of the pre-heating period than during the actuation period. Pre-heating the SMA 10 at a lower power during at least part of the pre-heating period means that the energy needed to heat the SMA 10 to cause actuation is supplied over a longer period of time than if the maximum current were drawn from the current source 24. This reduces the demands on the current source 24. In some embodiments, the drive current has a lower time-averaged power during at least 50%, preferably at least 75%, more preferably at least 90% of the pre-heating period than during the actuation period. In some embodiments, the drive current has a lower power during the entire pre-heating period than during the actuation period. This provides the maximum benefit of reduced power consumption during the pre-heating period.

In some embodiments, during the preheating period, the temperature of the shape memory alloy 10 is raised to a transition temperature at which the shape memory alloy 10 starts to transform. This may be advantageous because it minimises the amount of energy that is required to be delivered during the actuation period. This allows the actuation period to be minimised as far as possible, or could mean that the strain on the current source 24 is reduced during the actuation period.

In some embodiments, during the actuation period, the temperature of the shape memory alloy 10 is raised to a temperature above a transition temperature at which the shape memory alloy 10 starts to transform. This ensures that the SMA is fully transformed, such that the haptic effect is provided as intended.

In some embodiments, the pre-heating period comprises an initial heating period in which the temperature of the shape memory alloy 10 is raised, and a hold period in which the temperature of the shape memory alloy 10 is held within a predetermined temperature range. The predetermined temperature range may be below the transition temperature at which the SMA 10 starts to transform from one crystalline state to another. The SMA 10 may be held in a temperature range with a lower bound, for example, at most 5° C. below, preferably at most 2° C. below, more preferably at most 1° C. below. The size of the temperature range is preferably small, so that the response of the SMA 10 after the hold period is predictable and consistent. For example, the size of the temperature range may be at most 1° C., preferably 0.5° C., more preferably 0.2° C. Most preferably, the SMA 10 may be held at the transition temperature. This optional hold period allows the temperature of the SMA 10 to be held at or close to the transition temperature, so that the actuator 2 can be rapidly actuated when required. The power of the drive current during the hold period may be lower than the power of the drive current during the initial heating period.

In some embodiments, the drive circuit 20 comprises a current source 24 and is arranged to supply drive current to the actuator 2 during the pre-heating period and the actuation period from the current source 24. In other words, the same current source 24 is used to supply drive current for both pre-heating and actuation. Where the SMA haptic assembly is used in a mobile device, the current source 24 may be a battery. In this context, the term current source is used to mean any source of current, and not necessarily a power supply configured to provide a constant current output. A current source 24 such as a battery of a mobile device may not be able to sustain a sufficiently high current to supply the total energy required to heat the SMA 10 and cause it to transition between states in a time that is short enough to produce a satisfactory haptic signal, or sustaining the high current may place an unacceptably high demand on the output of the current source 24. However, the battery may be able to supply a current higher than its maximum continuous output current for short periods. In the case of the example above, the battery may be able to output a current of 1 A for the 2 ms required to deliver the 7 mJ of energy to transform the SMA 10. Therefore, although the same current source 24 is used for the pre-heating period and the actuation period, the actuation period for the haptic signal is still reduced.

The control of the drive current may be provided by switching the drive current to the actuator 2 on and off e.g. at frequencies of the order of Hz, kHz or MHz, i.e. by modulating the drive current. In some embodiments, the drive circuit 20 is arranged to supply pulse width modulated drive current to the actuator 2 during the pre-heating period and the actuation period with modulations having a different profile in the pre-heating period and the actuation period. The modulations may differ in the duty cycle of the pulse-width modulation, i.e. the length of the pulse as a percentage of the time between the starts of successive pulses. During the actuation period, the duty cycle is increased relative to the pre-heating period to supply a larger average current. In some embodiments, the drive current is supplied continuously during the actuation period, i.e. the pulse-width modulation in the actuation period has a duty cycle of 100%. Using pulse-width modulation allows the power supplied by the drive circuit 20 to be varied without having to change the voltage of the current source 24. It also allows the average current supplied from the current source 24 to be kept below a maximum allowed sustained output current of the power supply, in a situation such as described above where the voltage of the current source 24 and the resistance of the actuator would result in too high a current being drawn if no further control was provided.

In some embodiments, the drive circuit 20 is arranged to supply drive current to the actuator 2 during the at least part of the pre-heating period and the actuation period with different voltages in the pre-heating period and the actuation period. This means that the power of the drive current is controlled by varying the voltage of the current source 24, instead of or in addition to varying a modulation of the drive current.

In some embodiments, the drive circuit 20 comprises a current source 24 and a capacitive element 26 and is arranged to supply the drive current to the actuator 2 during the pre-heating period from the current source 24 and during the actuation period at least partially from the capacitive element 26. The capacitive element 26 may be any suitable type, for example an electrolytic capacitor or a ceramic capacitor. This provides an alternative method to increase the power delivered to the actuator 2 during the actuation period. This may be advantageous where the current source 24 is a battery that is not able or permitted to provide higher current than a maximum continuous current for short periods of time. In this case, even a continuous drive current (i.e. modulation with 100% duty cycle) during the actuation period may be insufficient to actuate the actuator 2 in a short enough time to provide a satisfactory haptic signal, and so a capacitive element 26 is used to supply the higher power needed during the actuation period. However, because the SMA 10 has already been pre-heated in the pre-heating period by the drive current from the current source 24, the energy that must be supplied during the actuation period to generate the haptic signal is reduced. Therefore the capacitive element 26 can be made much smaller than would be possible if the capacitive element 26 were to supply all of the energy needed to heat the SMA 10 to the transition temperature and cause it to transform. In the example given above, the 7 mJ of energy required during the actuation period could be supplied completely from the capacitive element 26 while still generating a 2 ms haptic signal. Consequently, the capacitive element 26 could be much smaller than would be necessary if the capacitive element 26 were to provide the full 17 mJ. In another embodiment, the energy required during the actuation period could be supplied by a combination of power from the current source 24 and from the capacitive element 26. This would further reduce the energy that needs to be stored in the capacitive element 26, further reducing the physical size of the capacitive element 26.

In some embodiments, the capacitive element 26 is charged before the pre-heating period. In an alternative embodiment, the drive circuit 20 is arranged so that the current source 24 charges the capacitive element 26 during the pre-heating period. In either case, the drive circuit 20 is configured to discharge the capacitive element 26 through the actuator 2 during the actuation period. Charging the capacitive element 26 during the pre-heating period may reduce energy lost due to leakage through the capacitive element 26 compared to embodiments where the capacitive element 26 is charged prior to the pre-heating period. However, charging the capacitive element 26 during the pre-heating period may also increase the length of the pre-heating period needed to heat the SMA 10 to the transition temperature and charge the capacitive element 26.

A simplified graph of control of the SMA assembly is shown in FIG. 2. The pre-heating period may be carried out at different times in response to different trigger events. In some embodiments, the pre-heating period is commenced in response to a demand signal for a haptic signal. In the graph of FIG. 2, this would correspond to a demand signal being triggered at time $S_1$. Following the demand signal, a drive current is supplied to the actuator 2, and the temperature of the SMA 10 rises. At time $S_2$, following an the pre-heating period, the drive current is increased, and the SMA 10 transforms, producing the haptic signal.

It is known that a latency of up to 80 ms between requesting and providing the haptic signal is not noticeable to the user. This period of time can be used as the pre-heating period to heat the SMA 10 to the transition temperature. In this case the pre-heating period would be commenced in response to a demand signal, such as a button press event. The actuation period would follow on immediately after the pre-heating period. In some embodiments, the pre-heating period has a length of at most 80 ms, preferably at most 60 ms, more preferably at most 50 ms, more preferably at most 40 ms, most preferably at most 20 ms.

In some embodiments, the pre-heating period is commenced in advance of a demand signal for a haptic signal and the actuation period is commenced in response to said demand signal. This may be desirable if latency between the demand signal and actuation would not be acceptable, for example if a delay of the length of the pre-heating period would be perceptible to the user. In this embodiment, the demand signal would occur at time $S_2$ in FIG. 2. In some embodiments, the pre-heating period is commenced in response to occurrence of a precursor event. In this embodiment, the precursor event would occur at time $S_1$ in FIG. 2. The precursor event may correspond to events that are expected to immediately precede an event for which a haptic signal providing feedback would be desired. For example, the precursor event could be detecting contact with a button through a contact sensor (e.g. a capacitive sensor), or detecting a low force applied to a button with a force sensor, where the low force is below a threshold signifying that actuation is required. In this case the pre-heating period may comprise an initial heating period in which the temperature of the SMA 10 is raised, and a hold period in which the temperature of the shape memory alloy 10 is held within a predetermined temperature range. For example, as described above, the SMA 10 may be maintained at a temperature in a range at or just below (for example, at most 5° C. below, optionally at most 2° C. below, optionally at most 1° C. below) the transition temperature. In such embodiments, the drive circuit 20 may stop supplying the drive current to the actuator 2, and allow the temperature of the SMA 10 to reduce below the transition temperature, if a demand signal is not received within a certain time period after the precursor event. The drive circuit 20 may also stop supplying drive current if the precursor event ceases without the occurrence of a demand signal, e.g. if contact with the button is removed without the button being actuated.

Figure 3:
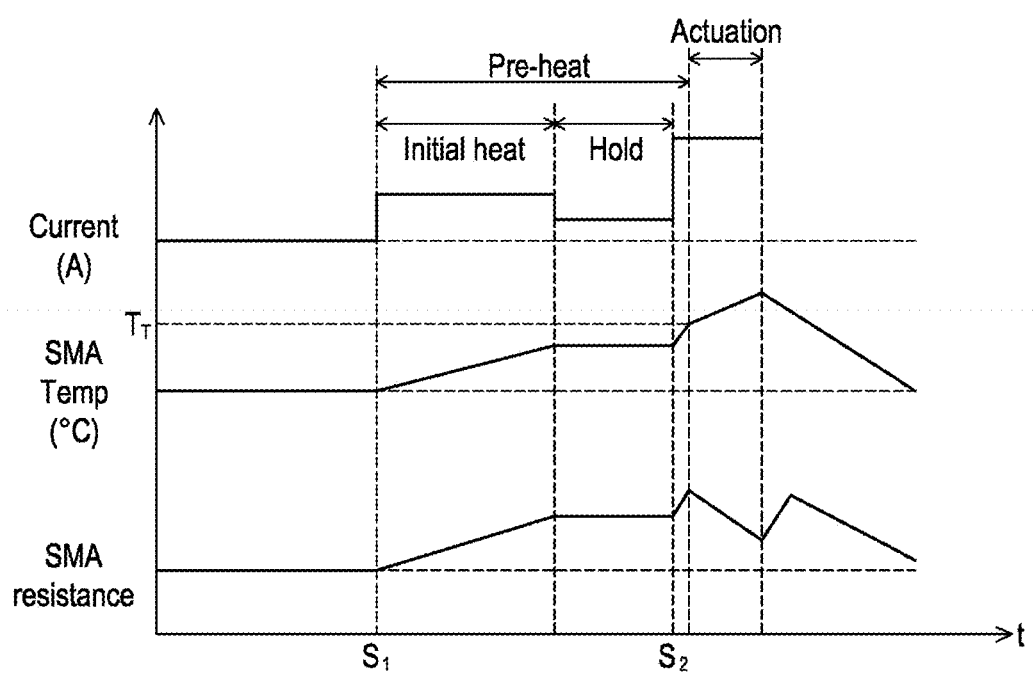
FIG. 3 is a graph showing a further example of control of an actuator according to the invention.

Another example of control of the SMA assembly is shown in FIG. 3, in which the power of the drive current is lower during the pre-heating period than during the actuation period for only part of the pre-heating period. In this example, the pre-heating period comprises an initial heating period and a hold period, and the SMA 10 is not heated to the transition temperature during the initial heating period, but to a temperature within a predetermined range below the transition temperature. The SMA 10 is then held at that temperature below the transition temperature during the hold period. In response to a demand signal at time $S_2$, the power of the drive current is increased to heat the SMA 10 to the transition temperature, and then the actuation period is begun, with the drive current maintained at the higher power. This embodiment still provides some benefit, because the high power is not required for most of the pre-heating period. However, it is preferred that the power of the drive current is lower during the entire pre-heating period than during the actuation period, as the example of FIG. 3 may cause increased latency following the demand signal due to the need to heat the SMA 10 the remaining way to the transition temperature before actuation can occur.

In some embodiments, the shape memory alloy haptic assembly further comprises a temperature sensor 30 arranged to sense the ambient temperature, and the drive circuit 20 is arranged to control the supply of drive current during the pre-heating period and/or the actuation period based on sensed ambient temperature. The temperature sensor 30 may comprise a thermistor, thermocouple, or similar device. The amount of energy supplied to the SMA 10 during the pre-heat period can be calculated from the ambient temperature, because the amount of energy needed to heat the SMA 10 to the transition temperature will depend on the temperature of the SMA 10 before it is heated, i.e. the ambient temperature. The drive circuit 20 can use the ambient temperature to determine how much energy is needed to heat the SMA 10 to the transition temperature and control the supply of drive current during the pre-heating period accordingly. In addition, the ambient temperature will determine how fast heat is lost from the SMA 10 when it is at the transition temperature. For example, the SMA 10 will radiate heat faster if the ambient temperature is further below the transition temperature. Therefore, if the ambient temperature is lower, a larger proportion of the power supplied to the actuator 2 by the drive current will be lost to the surroundings. By measuring the ambient temperature, the drive circuit 20 can control the supply of drive current during the actuation period to supply all of the energy to the SMA 10 that is required to cause it to fully transform between the two crystalline states.

In some embodiments, said control of the supply of drive current during the pre-heating period and/or the actuation period is control of the length of the pre-heating period and/or the length of the actuation period. If the ambient temperature is such that more total energy needs to be delivered during the pre-heating period and/or the actuation period, the length of the periods can be adjusted accordingly. In some embodiments, said control of the supply of drive current during the pre-heating period and/or the actuation period is control of the power of the drive current during the pre-heating period and/or control of the power of the drive current during the actuation period. The energy delivered may also be adjusted using the power of the drive current. Control of the power of the drive current could be achieved by altering the voltage of the current source 24, the magnitude of the drive current, or by controlling the duty cycle of the pulse-width modulation applied to the drive current in embodiments where pulse-width modulation is used. If the power of the drive current is controlled, it may be possible to maintain uniform lengths of the pre-heating period at a range of temperatures. This may be desirable if the actuation of the assembly is to interact with other functionality in a device, and variation in the response time of the actuator 2 would cause difficulties in such interactions. For example, the power may be increased at lower ambient temperatures in order to supply the greater amount of energy needed in the same length of time.

In embodiments where the drive circuit 20 supplies drive current during a hold period, the drive circuit 20 is arranged to control the drive current during the hold period based on the ambient temperature. Since the rate of heat loss is higher at lower ambient temperatures, a larger drive current will be required to maintain the temperature of the SMA 10 at the transition temperature during the hold period.

Figure 7:
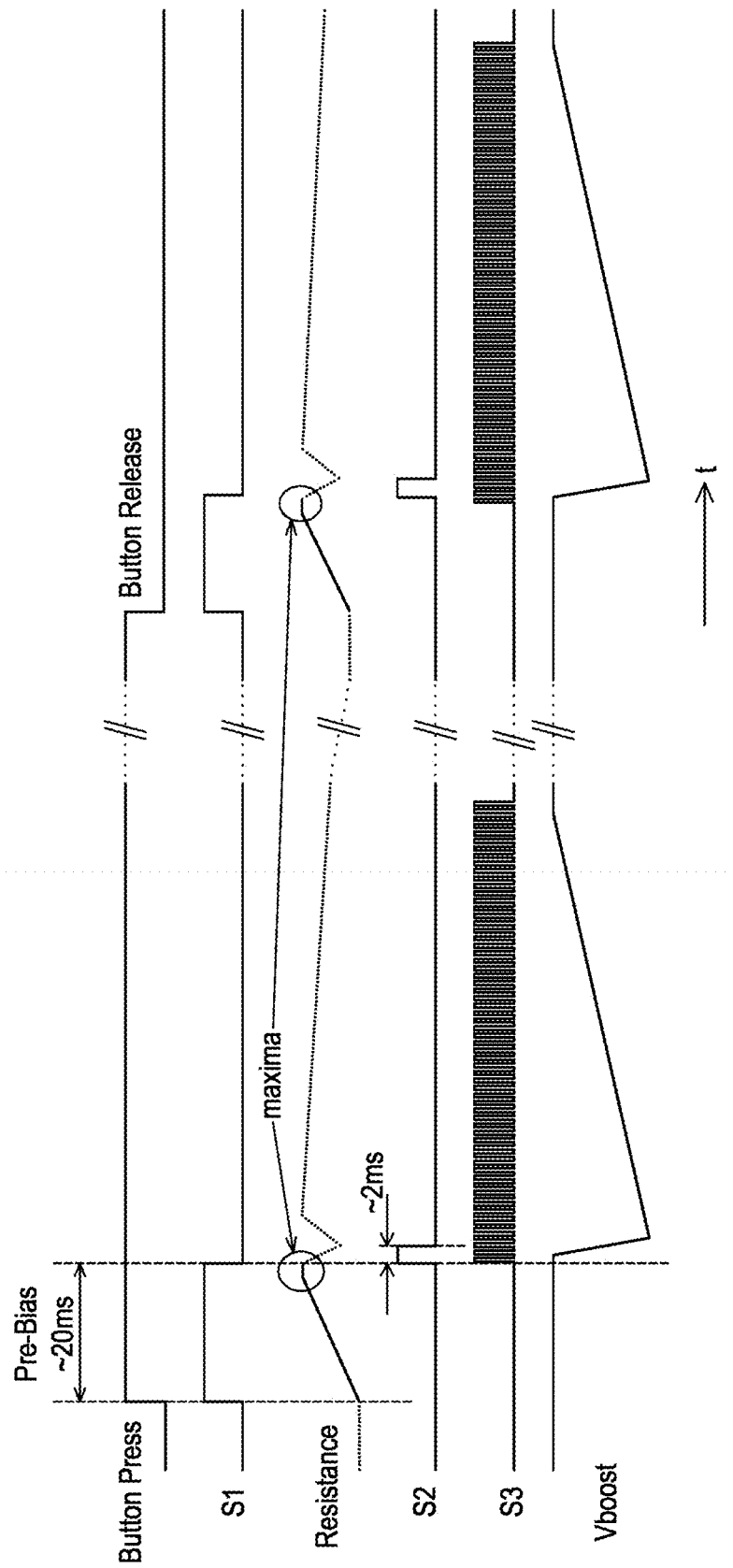
FIG. 7 is a graph showing how the circuit of FIG. 6 may be controlled.

An alternative method to determine how long to heat the SMA 10 to reach the transition temperature would be to monitor the resistance of the actuator 2, so the drive circuit 20 can identify when the SMA 10 reaches the transition temperature. As shown in FIG. 7, the resistance of the SMA 10 reduces during the transformation of the SMA 10 between the two crystalline states. This is because, as the SMA 10 contracts, its diameter increases and its length decreases, which in turn reduces the resistance of the SMA wire. To detect when the SMA 10 reaches the transition temperature, it is sufficient to detect the point at which the SMA resistance reaches a maximum and starts to reduce. This would not require accurate determination of the absolute value of the SMA resistance, and so an advantage of resistance sensing is that the resistance measurement does not need to be accurate to determine when the SMA 10 reaches the transition temperature.

In some embodiments, the shape memory alloy haptic assembly further comprises a resistance measurement circuit 28 arranged to detect a measure of resistance of the actuator 2, and the drive circuit 20 is arranged to control the supply of drive current during the pre-heating period based on the detected measure of resistance. This would remove the requirement for a temperature sensor 30, although in some embodiments a temperature sensor 30 may still be provided. The time required to reach the maxima of the SMA resistance could still be used to estimate ambient temperature. In some embodiments, said control of the supply of drive current during the pre-heating period is control of the length of the pre-heating period. The drive circuit 20 may also use the measure of resistance to determine the temperature of the SMA 10 prior to supplying the drive current, and thereby estimate the ambient temperature. This can be used to calculate the required length of the pre-heating period in the same way as when a temperature sensor 30 is used to measure the ambient temperature. In some embodiments, said control of the supply of drive current during the pre-heating period is control of the power of the drive current during the pre-heating period. As described above, this may be achieved using control of the voltage of the current source 24, the magnitude of the drive current, or the duty cycle of the pulse-width modulation applied to the drive current. If the power of the drive current is controlled, it may be possible to maintain a uniform length of the pre-heating period at a range of temperatures. As mentioned above, this may be desirable if the actuation of the assembly is to interact with other functionality in a device, and variation in the response time of the actuator 2 would cause difficulties in such interactions. For example, the power may be increased at lower ambient temperatures in order to supply the greater amount of energy needed in the same length of time.

During the hold period the charge on the capacitive element 26 and/or the temperature of the SMA 10 might need to be maintained. This can be done using the same circuits as used in the initial heating period to charge the capacitive element 26 and pre-heat the SMA 10. The drive current needed to maintain the temperature of the SMA 10 and the charge on the capacitive element 26 during the hold period will be lower than the drive current used to raise the temperature of the SMA 10 during the initial heating period. As discussed above, the drive current during the hold period may also depend on the ambient temperature.

In some embodiments, the drive circuit 20 is arranged to control the length of the actuation period based on the length of the pre-heating period. As mentioned above, factors such as the ambient temperature may affect how much of the power supplied to the actuator 2 by the drive current is lost, and therefore how long it takes to heat the SMA 10 to the transition temperature. Therefore, if the pre-heating period is longer (for example due to a lower ambient temperature), the drive circuit 20 may determine that the actuation period should be made longer in order that all of the energy required to fully transform the SMA 10 is supplied to the SMA 10. If the actuation period were not adjusted, the SMA 10 may not be fully transformed at lower ambient temperatures where the proportion of the power supplied to the actuator 2 that is lost to the surroundings is higher.

In some embodiments, the actuation period has a length of at most 10 ms, preferably at most 5 ms, or more preferably at most 2 ms. During the actuation period it is desirable that the drive circuit 20 is able to draw power from the current source 24 at the maximum permitted rate. If the assembly comprises a capacitive element 26, it is also desirable that as much energy as possible is discharged from the capacitive element 26 to deposit the maximum amount of available energy into the SMA 10 during the actuation period. This can be achieved by minimising the RC time constant of the capacitive element 26 and the SMA 10. In some embodiments, the RC time constant of the capacitive element 26 and the SMA 10 is less than 3.33 ms, optionally less than 1.67 ms, optionally less than 0.667 ms. For example, if the actuation period is to have a duration of ≤2 ms, the RC time constant is preferably ≤0.667 ms.

Figure 6:
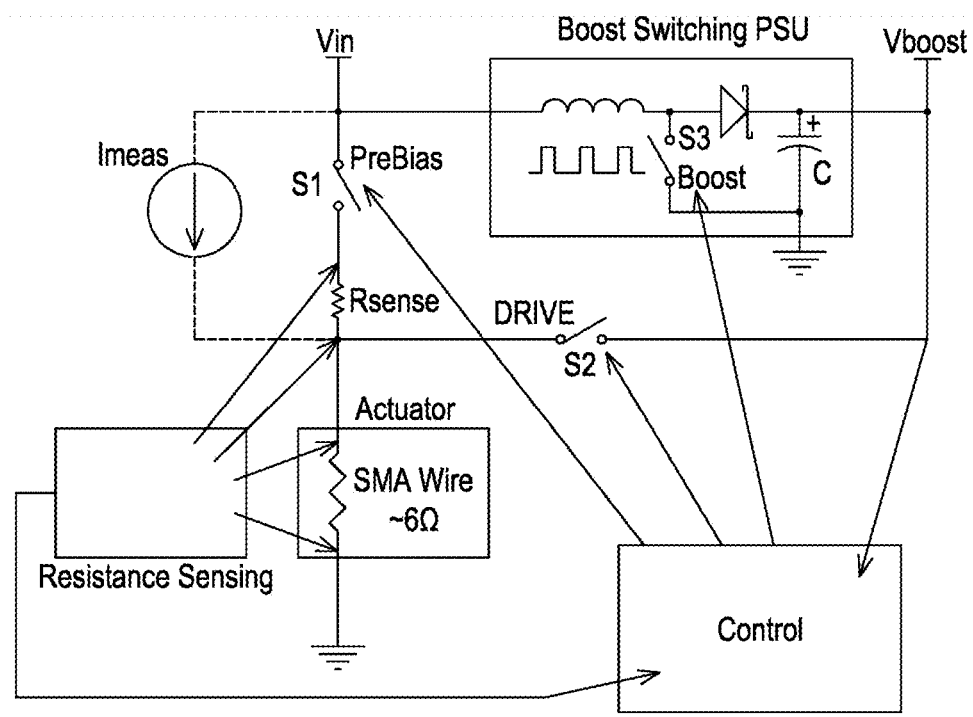
FIG. 6 is a circuit diagram of an assembly according to the invention.

A block diagram of an example SMA haptic assembly is shown in FIG. 6. Vin is the power supply from the current source 24. For an application in a mobile phone handset, the current source typically has a voltage of 5V, and can continuously supply ≤3 A. In the example of FIG. 6, the capacitive element 26 is the capacitor C. The capacitor C stores some of the energy required to produce the haptic signal during the actuation period.

In FIG. 6, closing switch S1 applies a pre-heat drive current to the SMA 10, which in this example is in the form of a wire. For example, assuming Vin is 3V, and the SMA wire has a resistance of 6Ω, the current source delivers a power of 1.5 W. This is typically sufficient power to heat the SMA wire to the transition temperature in a time of <20 ms, which is short enough to not be perceptible to the user. Vin should be specified based on the SMA resistance to deliver the maximum possible power to the SMA wire during the pre-heating period without exceeding the current capability of the current source 24.

Alternatively or additionally, the SMA wire could be designed to have a resistance optimised based on the specification of the power supply. Alternatively, if the voltage of the current source 24 and the resistance of the actuator are such that more current would be drawn than the current source 24 is able to continuously supply, S1 could be turned on and off to apply pulse-width modulation to the drive current from the current source 24, and a capacitor placed on the current source 24, to allow the current drawn to be regulated. When the transition temperature is reached, switch S1 can be opened to disable the pre-heat drive current.

In the example circuit of FIG. 6, S1 is open and S2 is closed during the actuation period. During the actuation period the boost power supply continues to operate to charge the capacitor C. The design of the boost power supply is such that the maximum permissible current is drawn from the current source 24 during the actuation period. The boost voltage, the capacitance of the capacitor C, and the resistance of the actuator 2 are selected so that the capacitor C discharges as much as possible in the actuation period. Switch S3 is controlled, as demonstrated in FIG. 7, in an attempt to regulate Vboost whilst S2 is closed. Since the power demand on the boost power supply during the actuation period is at or above what the boost power supply can deliver, Vboost is expected to drop significantly, as shown in FIG. 7.

Data from example embodiments shows that approximately half of the total energy supplied to the SMA wire is needed to heat the SMA wire to the transition temperature, and approximately half of the total energy is needed to fully transform the SMA wire to move the actuator 2 across its full displacement. Hence for typical embodiments that are designed for use in mobile devices, approximately 10 mJ must be stored in the capacitive element 26 if the capacitive element 26 is to supply all of the energy needed during the actuation period. In the example of FIG. 6, the capacitive element 26 is provided by the capacitor C. The capacitor is charged using a boost power supply. Using a boost power supply allows the voltage of the capacitor C to be higher than that of the current source 24, thereby storing more energy in the same physical size of capacitor than would be possible if the voltage of the current source was used directly. FIG. 6 shows a simple DC-DC boost power supply topology using an inductor, diode, capacitor and switch. Other known boost topologies could be used, such as a voltage multiplier using multiple capacitors and no inductors. Table 1 below illustrates the capacitor sizes needed as Vboost is increased, based on commonly available circuit components.

TABLE 1

Capacitor parameters as a function of Vboost.

| Vboost (V) | Capacitance (pF) | Capacitors | RC (ms) | Size, (mm) |
|---|---|---|---|---|
| 5 | 800 | 3 × 330 uF 6.3 v | 6 | 10 × 2.5 × 2.8 |
| 9 | 250 | 3 × 100 uF 10 v | 1.8 | 10 × 1.6 × 1.6 |
| 15 | 89 | 2 × 47 uF 16 v | 0.56 | 6.4 × 1.6 × 1.6 |
| 24 | 35 | 2 × 22 uF or 47 uF 25 v | 0.3 | 4.0 × 1.25 × 1.25 or 3.2 × 1.6 × 1.6 |

This demonstrates there is a size advantage to operating at higher voltages, because a reduced capacitance is needed. Additionally, using a higher voltage to charge the capacitive element 26 reduces the RC time constant of the capacitive element 26 and the SMA wire, which may be desirable as discussed above. In some embodiments, the voltage across the capacitive element 26 when the capacitive element 26 is fully charged is at least 5V, optionally at least 9V, optionally at least 15V. Using the exemplary components from Table 1, a voltage of 15V or greater is needed to provide a 2 ms actuation period using power delivered by the capacitive element 26. However, the voltage across the capacitive element 26 cannot be made arbitrarily high, because higher voltages will impact on chip design of the drive circuit 20 as a larger silicon process would be required.

Resistance sensing could be implemented with a series current sense resistor in series with the SMA wire, such as that labelled Rsense in FIG. 6. By measuring the voltage across the current sense resistor (which has a known resistance), the current through the SMA wire can be determined. By also measuring the voltage across the SMA wire, the resistance of the SMA wire can be calculated. Alternatively, a current source (shown as Imeas in FIG. 6) could be used to deliver a known current to the SMA wire. The measurement of voltage across the SMA wire then allows the resistance of the SMA wire to be calculated. In FIG. 6, the current sense resistor is placed on the high voltage side of the SMA wire. Alternatively, the current sense resistor could be placed on the low voltage side of the SMA wire. In this case, the current sense resistor would be in circuit when the SMA wire is driven by the high voltage stored in the capacitor, so will reduce the power delivered to the actuator. The value of the current sense resistor is preferably minimised in this case. The advantage of a low side resistor is the sense voltage is reduced, and the common mode input voltage is reduced, which would be beneficial in the design of the boost power supply.

By way of example some further examples of energies and timescales are provided. A first actuator with an SMA wire with a resistance of 5.7Ω is driven from a 5.2V current source for a period of 5.5 ms to generate a haptic signal. In this case the total energy delivered is $$5.5 \text{ ms} \times \frac{(5.2 \text{ V})^2}{5.7 \Omega} = 26 \text{ mJ}.$$

The actuator moves over the final 2 ms and so the energy required during the actuation period is 9.5 mJ. A second device with an SMA wire with a resistance of 7.5Ω is driven from a 9.8V current source for a period of 5 ms to generate a haptic signal. In this case the total energy delivered is $$5 \text{ ms} \times \frac{(9.8 \text{ V})^2}{7.5 \Omega} = 64 \text{ mJ}.$$

The actuator moves over the final 1.8 ms and so the energy required during the actuation period is 23 mJ.

Figure 5:
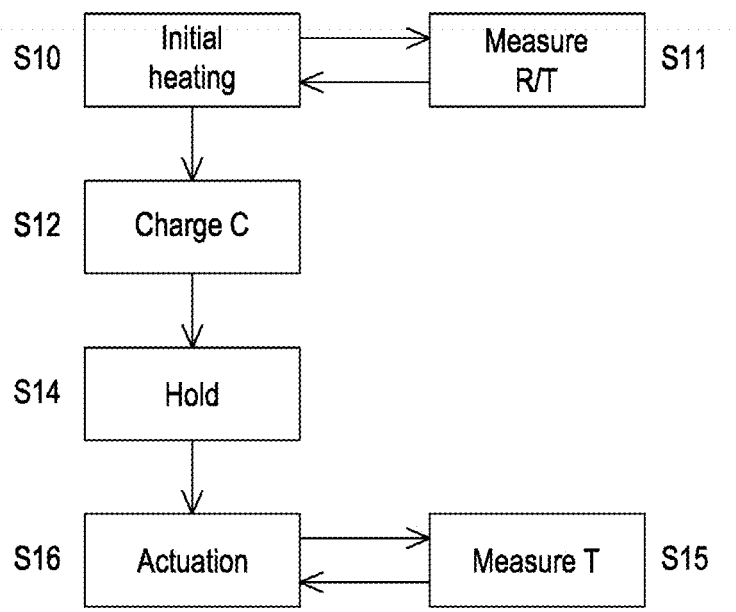
FIG. 5 is a flowchart of a method according to the invention.

A method of the first aspect is a method of driving a shape memory alloy haptic assembly comprising an actuator 2 such as that of FIG. 1. The method may comprise steps corresponding substantially to the configuration of the drive circuit 20 described above, and an embodiment of the method is shown in FIG. 5. The method comprises a step S10 of supplying drive current to the actuator 2 from a current source 24 during an initial heating period in which the temperature of the shape memory alloy 10 is raised. Step S10 is commenced in advance of a demand signal for a haptic signal, in response to occurrence of a precursor event. Concurrently with step S10, the method comprises a step S11 of detecting a measure of resistance of the actuator 2 and sensing the ambient temperature with a temperature sensor 30, and controlling the supply of drive current during the initial heating period based on the detected measure of resistance and the sensed ambient temperature. The method further comprises a step S12 of charging the capacitive element 26 during the pre-heating period.

The method further comprises a step S14 of supplying drive current to the actuator 2 during a hold period in which the temperature of the shape memory alloy 10 is held within a predetermined temperature range. In step S16, the hold period ends and an actuation period is commenced in response to said demand signal. In step S16, the method comprises supplying drive current to the actuator from the current source 24 and from the capacitive element 26 during the actuation period in which the temperature of the shape memory alloy is raised so as to cause the shape memory alloy to provide the haptic effect. Concurrently with step S16, the method comprises a step S15 of detecting a measure of resistance of the actuator 2 and sensing the ambient temperature with a temperature sensor 30, and controlling the supply of drive current during the actuation period based on the sensed ambient temperature.

The invention claimed is:

1. A method of driving a shape memory alloy haptic assembly comprising an actuator comprising shape memory alloy that is arranged on actuation to provide a haptic effect, the method comprising supplying drive current to the actuator successively during a pre-heating period in which the temperature of the shape memory alloy is raised without causing the shape memory alloy to provide the haptic effect and during an actuation period in which the temperature of the shape memory alloy is raised so as to cause the shape memory alloy to provide the haptic effect, wherein the drive current has a lower time-averaged power during at least part of the pre-heating period than during the actuation period.

2. The method according to claim 1, wherein the drive current has a lower time-averaged power during at least 50% of the pre-heating period than during the actuation period.

3. The method according to claim 1, wherein, during the pre-heating period, the temperature of the shape memory alloy is raised to a transition temperature at which the shape memory alloy starts to transform or to a temperature close to the transition temperature and wherein, during the actuation period, the temperature of the shape memory alloy is raised to a temperature above a transition temperature at which the shape memory alloy starts to transform.

4. The method according to claim 1, wherein the pre-heating period is commenced in response to a demand signal for a haptic effect.

5. The method according to claim 4, wherein the pre-heating period has a length of at most 80 ms.

6. The method according to claim 1, wherein the pre-heating period is commenced in advance of a demand signal for a haptic effect and the actuation period is commenced in response to said demand signal.

7. The method according to claim 6, wherein the pre-heating period is commenced in response to occurrence of a precursor event.

8. The method according to claim 1, wherein the pre-heating period comprises an initial heating period in which the temperature of the shape memory alloy is raised, and a hold period in which the temperature of the shape memory alloy is held within a predetermined temperature range.

9. The method according to claim 1, wherein the drive current is supplied to the actuator during the pre-heating period and the actuation period from the same current source.

10. The method according to claim 9, wherein the drive current is supplied to the actuator during the pre-heating period and the actuation period from the same current source that is pulse width modulated by modulations having a different profile in the pre-heating period and the actuation period or from the same current source with different voltages in the pre-heating period and the actuation period.

11. The method according to claim 1, wherein the drive current is supplied to the actuator during the pre-heating period from a current source and during the actuation period at least partially from a capacitive element.

12. The method according to claim 11, further comprising charging the capacitive element during the pre-heating period.

13. The method according to claim 1, further comprising detecting a measure of resistance of the actuator, and controlling the supply of drive current during the pre-heating period based on the detected measure of resistance.

14. The method according to claim 13, wherein said control of the supply of drive current during the pre-heating period is control of the length of the pre-heating period or control of the power of the drive current during the pre-heating period.

15. The method according to claim 14, further comprising controlling the length of the actuation period based on the length of the pre-heating period.

16. The method according to claim 1, further comprising sensing the ambient temperature with a temperature sensor, and controlling the supply of drive current during the pre-heating period and/or the actuation period based on sensed ambient temperature.

17. The method according to claim 16, wherein said control of the supply of drive current during the pre-heating period and/or the actuation period is control of the length of the pre-heating period and/or the length of the actuation period or control of the power of the drive current during the pre-heating period and/or control of the power of the drive current during the actuation period.

18. The method according to claim 1, wherein the actuation period has a length of at most 10 ms.

19. A shape memory alloy haptic assembly comprising:
an actuator comprising shape memory alloy that is arranged on actuation to provide a haptic effect; and
a drive circuit arranged to supply drive current to the actuator successively during a pre-heating period in which the temperature of the shape memory alloy is raised without causing the shape memory alloy to provide the haptic effect and during an actuation period in which the temperature of the shape memory alloy is raised so as to cause the shape memory alloy to provide the haptic effect, wherein the drive current has a lower time-averaged power during at least part of the pre-heating period than during the actuation period.

20. The method according to claim 1, wherein the drive current has a lower time-averaged power during the entire pre-heating period than during the actuation period.

\* \* \* \* \*